United States Patent
Jun et al.

(10) Patent No.: US 8,282,062 B2
(45) Date of Patent: Oct. 9, 2012

(54) TILTING DEVICE

(75) Inventors: Jae-Woo Jun, Suwon-si (KR); Han-Jin Park, Gwangmyeong-si (KR); Tae-Ho Yun, Hwaseong-si (KR); Dong-Su Moon, Hwaseong-si (KR); Kyung-Su Park, Suwon-si (KR); Jung-Kyu Yim, Suwon-si (KR); Dong-Won Choi, Suwon-si (KR)

(73) Assignee: Sentronix Co., Ltd., Suwon-Si (KR)

( * ) Notice: Subject to any disclaimer, the term of this patent is extended or adjusted under 35 U.S.C. 154(b) by 1202 days.

(21) Appl. No.: 12/149,105

(22) Filed: Apr. 25, 2008

(65) Prior Publication Data

US 2009/0133608 A1 May 28, 2009

(30) Foreign Application Priority Data

Nov. 27, 2007 (KR) .................. 10-2007-0121707

(51) Int. Cl.
*A47H 1/10* (2006.01)
(52) U.S. Cl. ........ 248/332; 248/492; 248/493; 248/919; 248/923; 361/679.22; 345/204
(58) Field of Classification Search .................. 248/332, 248/492, 493, 919, 922, 923; 345/204; 361/679.22; 361/679.01, 679.02, 681
See application file for complete search history.

(56) References Cited

U.S. PATENT DOCUMENTS

2007/0222776 A1* 9/2007 Choi et al. .................... 345/204
2007/0258200 A1* 11/2007 Choi et al. .................... 361/681

FOREIGN PATENT DOCUMENTS

KR 2002-0078869 10/2002
KR 10-2005-0073654 7/2005

OTHER PUBLICATIONS

Korean Patent Office Action, mailed Sep. 5, 2008 and issued in corresponding Korean Patent Application No. 10-2007-0121707.

* cited by examiner

*Primary Examiner* — Teri P. Luu
*Assistant Examiner* — Todd M Epps

(57) ABSTRACT

A tilting device is disclosed. The tilting device may include: an arm, on which a tilt-shaft is formed; a tilt-base coupled to the tilt-shaft in a manner that allows tilting; a pulley rotatably coupled to the tilt-base; a wire, which is wound around the pulley, and of which either end is coupled to either side of the arm on opposite sides of the tilt-shaft; and a driving unit, which drives the pulley. An embodiment of the invention enables tilting operations using a smaller driving device, and also allows manual operations.

5 Claims, 8 Drawing Sheets

TILTING DEVICE

CROSS-REFERENCE TO RELATED APPLICATIONS

This application claims the benefit of Korean Patent Application No. 10-2007-0121707 filed with the Korean Intellectual Property Office on Nov. 27, 2007, the disclosure of which is incorporated herein by reference in its entirety.

BACKGROUND

1. Technical Field

The present invention relates to a tilting device.

2. Description of the Related Art

Flat panel displays, such as TV sets and monitors, employing LCD, PDP, LED technology, etc., provide the benefit of allowing efficient use of small spaces, and are fast replacing Braun tube TV's and monitors. The increase in demand for such flat panel displays is expected to continue into the future. However, due to the thin thicknesses of these flat panel displays, it is difficult to have a flat panel display stand by itself, and thus wall mount devices are being developed, which allow flat panel displays to be mounted on walls.

The conventional wall mount, however, simply affixes the display onto the wall, so that when a user changes one's position, the optimal viewing angle cannot be maintained.

Also, when automatically tilting a mass, e.g. a display, an appropriate power source is required according to the weight of the mass. For a large display, the weight of which can be over 40 kg, a large capacity power source may be required for tilting the display, which can impose additional space limitations and increase cost.

To resolve this problem, a tilting device coupled to the wall mount was used to automatically implement tilting motions using a belt or lead screws, etc. This, however, can be a source of much noise, and may not enable manual operation.

SUMMARY

An aspect of the invention provides an automatic tilting device, which enables tilting operations using a smaller driving device, and which allows manual operations.

Another aspect of the invention provides a tilting device that includes: an arm, on which a tilt-shaft is formed; a tilt-base coupled to the tilt-shaft in a manner that allows tilting; a pulley rotatably coupled to the tilt-base; a wire, which is wound around the pulley, and of which either end is coupled to either side of the arm on opposite sides of the tilt-shaft; and a driving unit, which drives the pulley.

Here, the wire can include a first wire, which may be coupled to one side of the arm, and a second wire, which may be coupled to the other side of the arm, with the first wire and the second wire wound around the pulley in opposite directions.

The pulley can include: a first pulley, around which the first wire may be wound; and a second pulley, which may be secured to the first pulley, and around which the second wire may be wound, where the ratio of a diameter of the first pulley to a diameter of the second pulleys may be substantially equal to the ratio of a distance between the tilt-shaft and the one side of the arm to a distance between the tilt-shaft and the other side of the arm.

The tilting device may further include a friction wheel unit interposed between the pulley and the driving unit. The tilting device may also include an elastic member, which may be interposed between the tilt-base and the arm, and which may apply a pressure on the tilt-base that tilts the tilt-base in a direction opposing gravity. Here, the elastic member can be a prestressed spring, which may be wound around the tilt-shaft to apply a pressure on the tilt-base.

The tilting device may further include a sensor unit that identifies a tilting angle of the tilt-base, where the sensor unit can be coupled to the pulley to measure a rotation amount of the pulley.

Additional aspects and advantages of the present invention will be set forth in part in the description which follows, and in part will be obvious from the description, or may be learned by practice of the invention.

DETAILED DESCRIPTION

Figure 1:
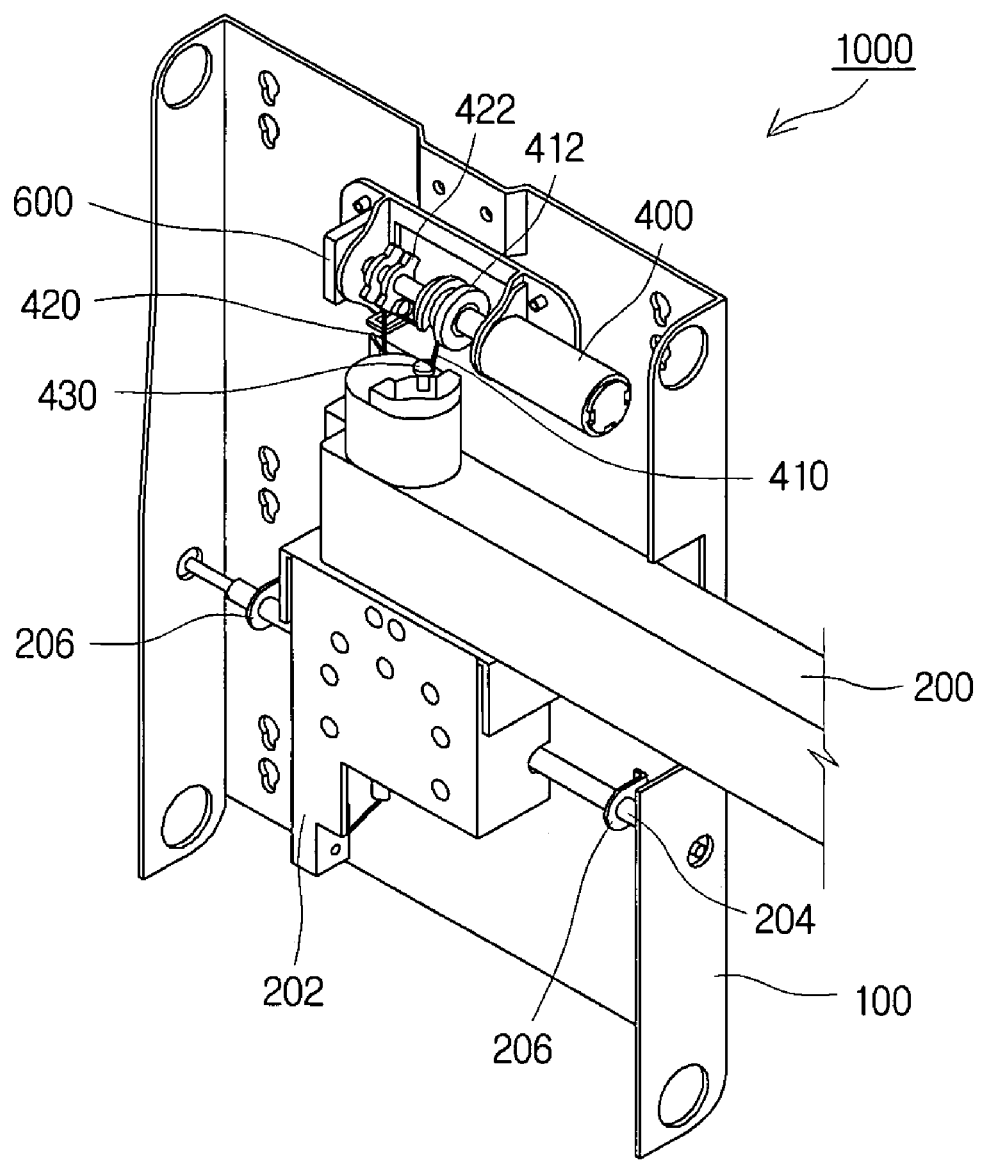
FIG. 1 is a perspective view illustrating a tilting device according to an embodiment of the invention.

The tilting device according to certain embodiments of the invention will be described below in more detail with reference to the accompanying drawings. Those components that are the same or are in correspondence are rendered the same reference numeral regardless of the figure number, and redundant explanations are omitted.

FIG. 1 is a perspective view illustrating a tilting device 1000 according to an embodiment of the invention. In FIG. 1, there are illustrated a tilt-base 100, an arm 200, a tilt-hanger 202, a tilt-shaft 204, a tilt-holder 206, a geared motor 400, a first wire 410, a first pulley 412, a second wire 420, and a second pulley 422.

As illustrated in FIG. 1, a tilting device 1000 according to an embodiment of the invention may include an arm 200, on which a tilt-shaft 204 may be formed; a tilt-base 100, which may be coupled to the tilt-shaft 204 in a manner that allows tilting; a pulley, which may be rotatably coupled to the tilt-base 100; a wire, which may be wound around the pulley, and of which either end may be coupled to either side of the arm 200 on opposite sides of the tilt-shaft 204; and a driving unit, which may drive the pulley. The tilting device 1000 enables tilting operations using a smaller driving device, and also allows manual operations.

The tilting device 1000 is a device that can couple a mass, such as a display device, to a support, such as a wall surface or stand, etc., and can adjust the upward/downward inclination.

The arm 200 may have one end coupled to the tilt-base 100 by the tilt-shaft 204, and the other end coupled to the support, such as a wall surface or a stand, etc. In this particular embodiment, a tilt-hanger 202 may be coupled to the one end of the arm 200, for the coupling to the tilt-base 100. The tilt-hanger 202 may be coupled with the arm 200 to allow swiveling about a center shaft 208. The tilt-base 100 may be tiltably coupled to the tilt-hanger 202 by way of the tilt-shaft 204.

Figure 2:
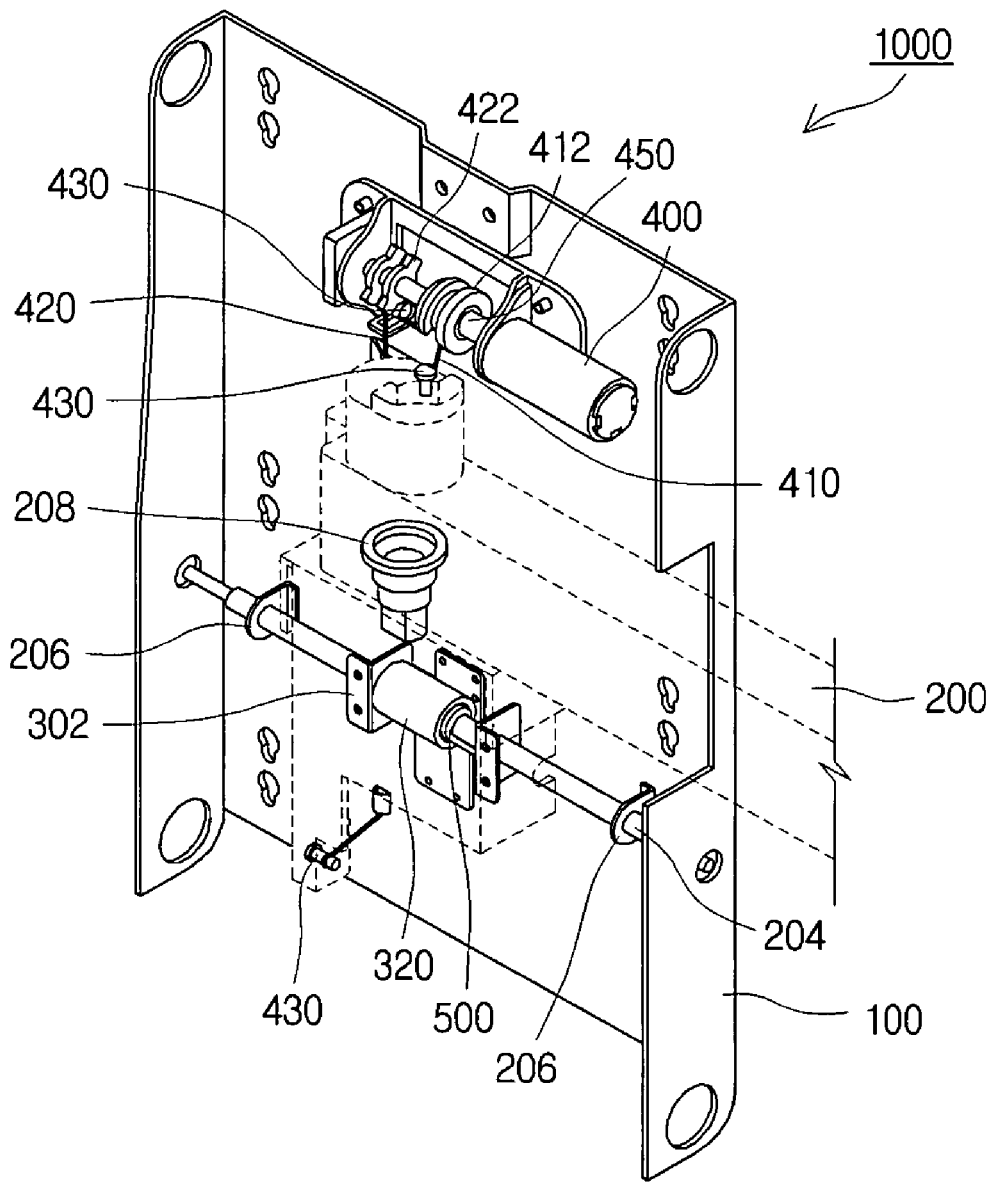
FIG. 2 is a perspective view illustrating a portion of a tilting device according to an embodiment of the invention.

FIG. 2 is a perspective view illustrating a portion of a tilting device 1000 according to an embodiment of the invention. In FIG. 2, there are illustrated a center shaft 208, a spring angle changer 300, spring side guides 302, a spring holder 320, a securing pin 430, and a friction wheel unit 450.

As illustrated in FIG. 2, the tilt-base 100 may be tiltably coupled to the tilt-shaft 204. The tilt-base 100 can be the portion to which a mass, such as a display device, etc., may be coupled. The tilt-base 100 may enable tilting about the tilt-shaft 204.

The pulley may be rotatably coupled to the tilt-base 100. The pulley can be the portion which the wire is wound around, and can be driven by a geared motor 400. The wire may be wound around the pulley, and may have either end coupled to either side of the arm 200 on opposing sides of the tilt-shaft 204.

Here, the wire may include a first wire 410, which can be coupled to one side of the arm 200, and a second wire 420, which can be coupled to the other side of the arm 200. The first and second wires 410, 420 can be wound around the pulley in opposite directions. Also, the pulley itself may include a first pulley 412, around which the first wire 410 may be wound, and a second wire 420 secured to the first pulley 412, around which the second pulley 422 may be wound.

Figure 3:
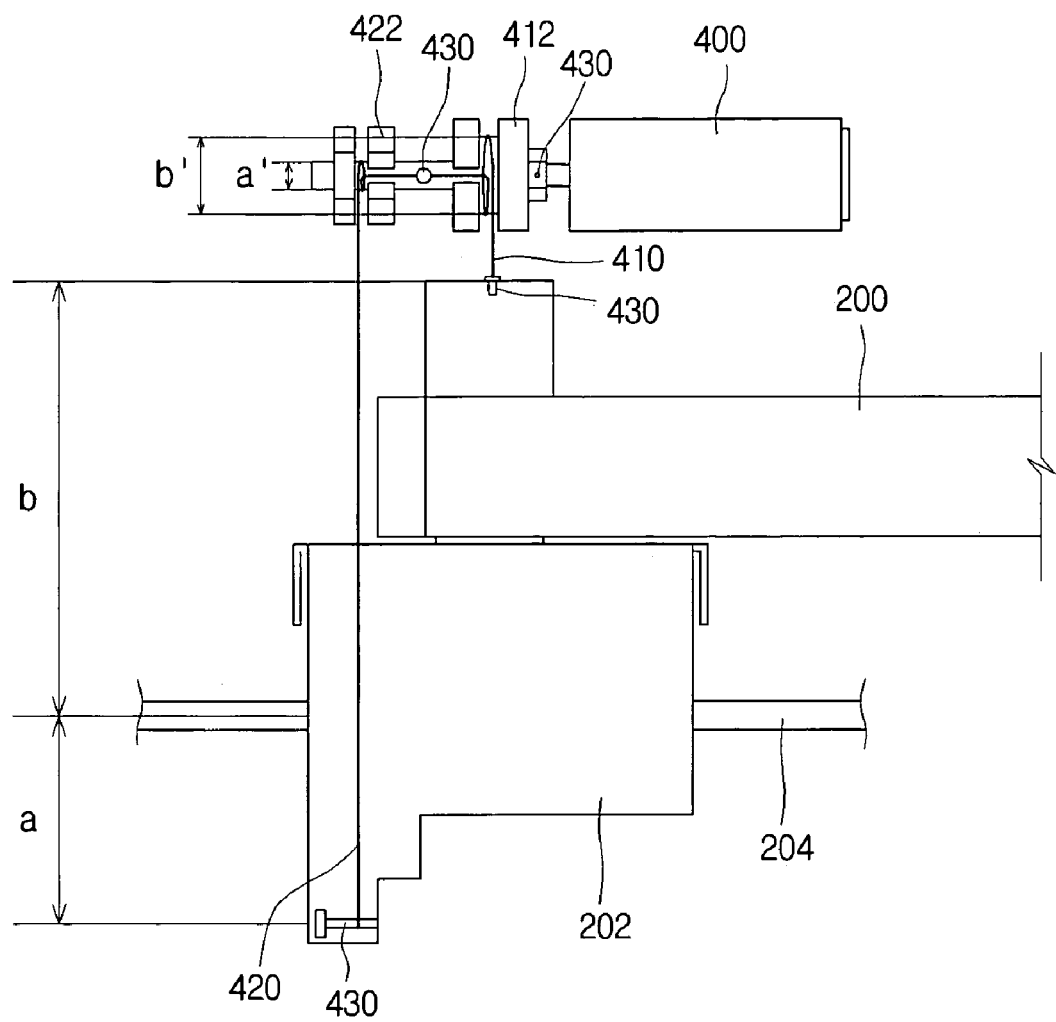
FIG. 3 is a front elevation view illustrating a portion of a tilting device according to an embodiment of the invention.

FIG. 3 is a front elevation view illustrating a portion of a tilting device 1000 according to an embodiment of the invention. A description will be provided on the operation of the tilting device 1000 as follows.

When the geared motor 400 rotates, which is a driving unit secured to the tilt-base 100, the first pulley 412 coupled to the geared motor 400 may rotate, and the first wire 410 coupled to one side of the arm 200 may be unwound. With the unwinding of the first wire 410, the tilt-base 100 may undergo a rotating motion about the tilt-shaft 204, due to the weight of the display device, etc., and thus tilt downwards. Here, the arm 200, center shaft 208, tilt-hanger 202, and spring side guides 302 may not be moved by the tilting operation.

Conversely, if the geared motor 400 rotates in an opposite direction to rotate the first pulley 412, the first wire 410 may be wound. With the winding of the first wire 410, the tilt-base 100 may undergo a rotating motion about the tilt-shaft 204 that implements an operation for tilting upwards.

Next, a description will be provided on the structure of the tilting device 1000 for preventing the display device from falling. As illustrated in FIG. 3, the ratio of the distance between the tilt-shaft 204 and the one side of the arm 200 to which the first wire 410 is coupled (b in FIG. 3) to the distance between the tilt-shaft 204 and the other side of the arm 200 to which the second wire 420 is coupled (a in FIG. 3) may be substantially the same as the ratio of the diameter of the first pulley 412 (b') to the diameter of the second pulley 422 (a'). Also, the first wire 410 and the second wire 420 may be wound in opposite directions, such that the unwinding of the first wire 410 causes the winding of the second wire 420.

Therefore, when the first pulley 412 is unwound, the tilt-base 100 may tilt downwards, while the second wire 420 may be wound around the second pulley 422. The second wire 420 may maintain a level of tension without loosening, regardless of the angle of the tilt-base 100, and may serve as a stopper against the rotational force that occurs when a user pushes the tilt-base 100 upwards while it is in a halted state.

The first wire 410 and second wire 420 may each have one end coupled to one side and the other side of the arm 200, respectively, and may each have the other end wound around the first pulley 412 and second pulley 422, respectively, and secured by a wire-pulley securing pin 430.

Figure 4:
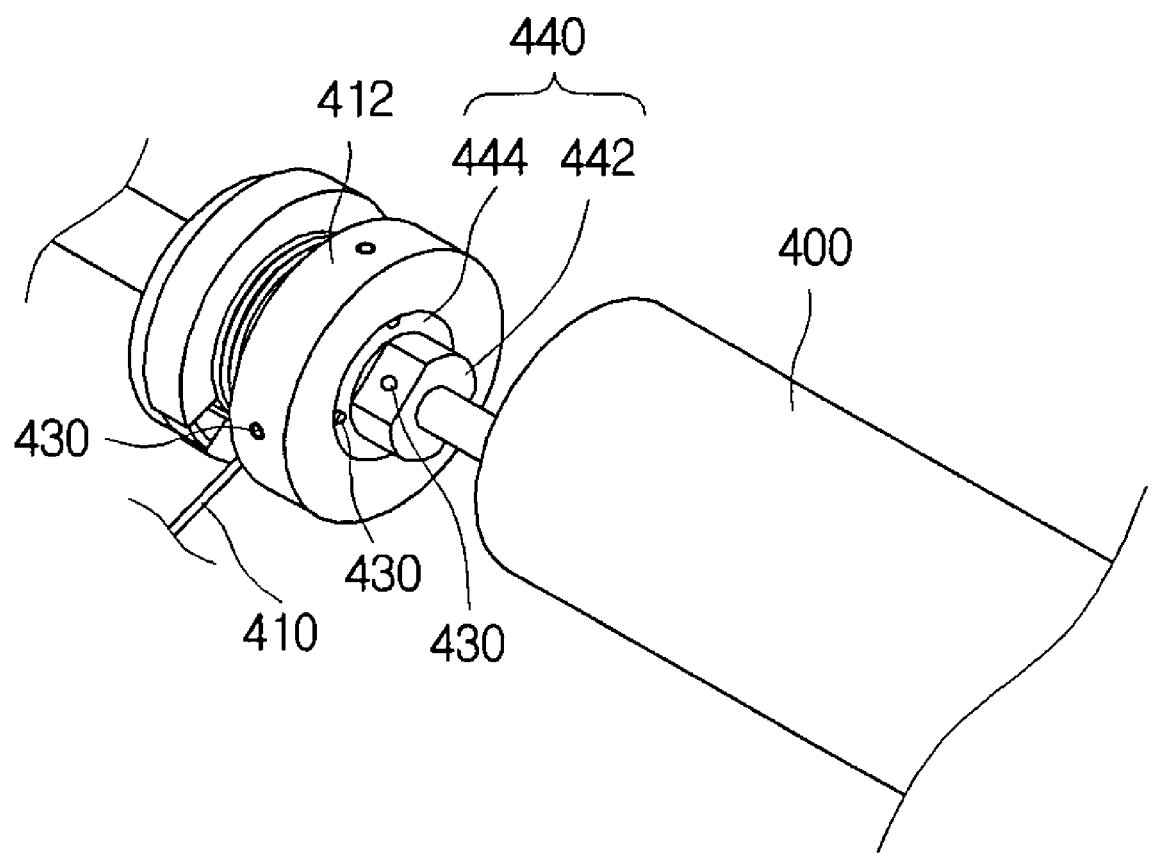
FIG. 4 is a perspective view illustrating a pulley according to an embodiment of the invention.

FIG. 4 is a perspective view illustrating a pulley according to an embodiment of the invention. A friction wheel unit 450 may be interposed between the pulley and the driving unit, i.e. geared motor 400. The friction wheel unit 450 may use the friction between two contacting surfaces to transfer force. Here, to be "interposed" means that it is placed in a position on a path of force transfer between the pulley and the geared motor 400, so as to transfer force.

The friction wheel unit 450 may include a first friction portion 442 and a second friction portion 444. The first friction portion 442 may be secured to the driving shaft of the geared motor 400 by a securing pin 430. The first friction portion 442 may also be secured with the first pulley 412 by the securing pin 430.

When the geared motor 400 rotates to tilt the tilt-base 100 downwards or upwards, there may be no relative movement between the first friction portion 442 and the second friction portion 444. However, when a user manually adjusts the tilting angle of the display device coupled to the tilt-base 100, an excessive load may be applied on the tilting device 1000. In this case, slipping may occur between the first friction portion 442 and the second friction portion 444 to protect the geared motor 400.

Figure 5:
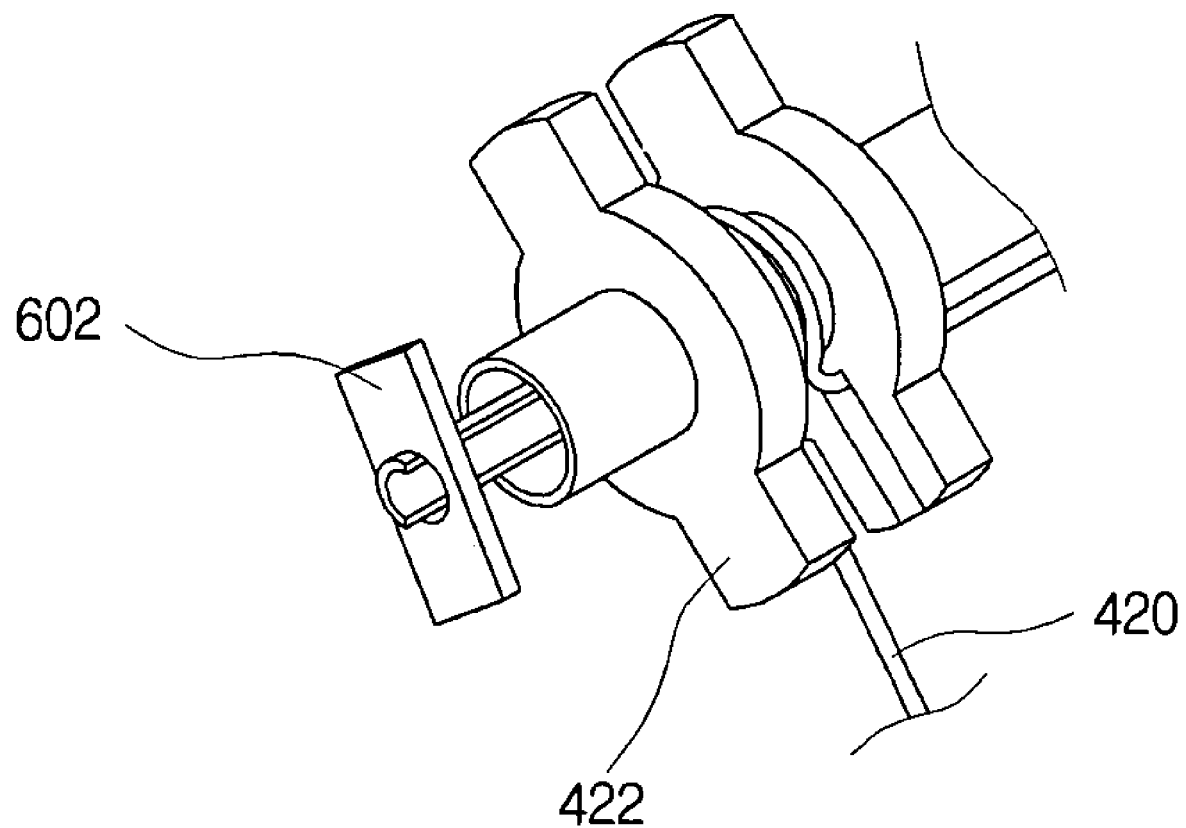
FIG. 5 is a perspective view illustrating a sensor unit according to an embodiment of the invention.

FIG. 5 is a perspective view illustrating a sensor unit 600 according to an embodiment of the invention. As illustrated in FIG. 5, the tilting device 1000 may include a sensor unit 600 that identifies the tilting angle of the tilt-base 100, where the sensor unit 600 may be coupled to the pulley to measure the amount of rotation of the pulley. The sensor unit 600 may include, for example, a potential meter 602. The potential meter 602 may rotate together with the pulley to identify the rotation of the pulley.

The tilting device 1000 may further include a control unit (not shown) that receives signals from the sensor unit 600, and controls the operation of the driving unit. When the user sets the tilting device to a particular angle to use a display device, the sensor unit 600 may identify the tilting angle obtained by the user, and transmit a corresponding signal to the control unit.

The control unit may store the viewing tilting angle received from the user, and later when the user turns on the tilting device, may deliver an operating signal to the driving unit to form the viewing tilting angle stored the latest.

Figure 6:
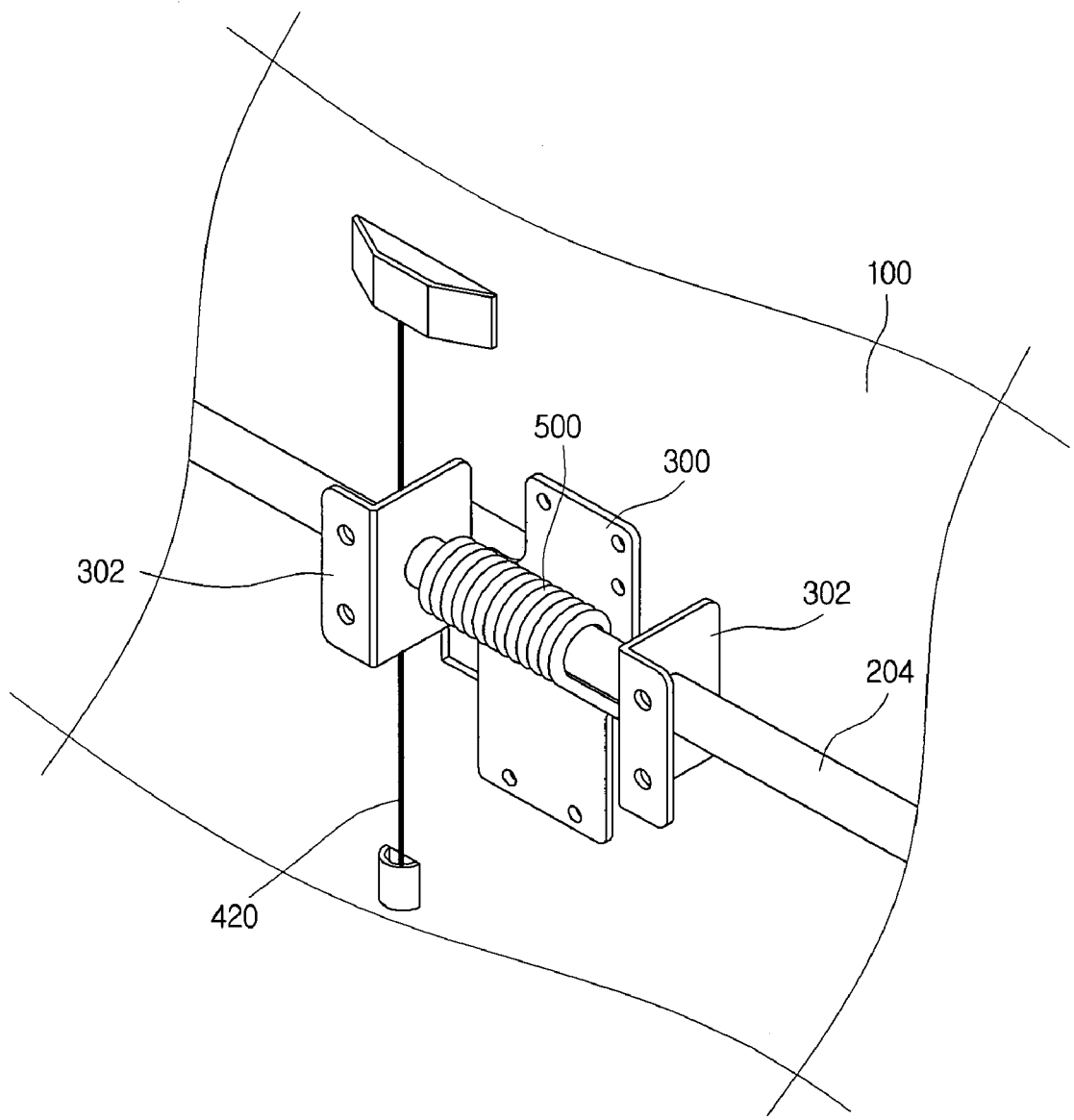
FIG. 6 is a perspective view illustrating a prestressed spring according to an embodiment of the invention.
Figure 7:
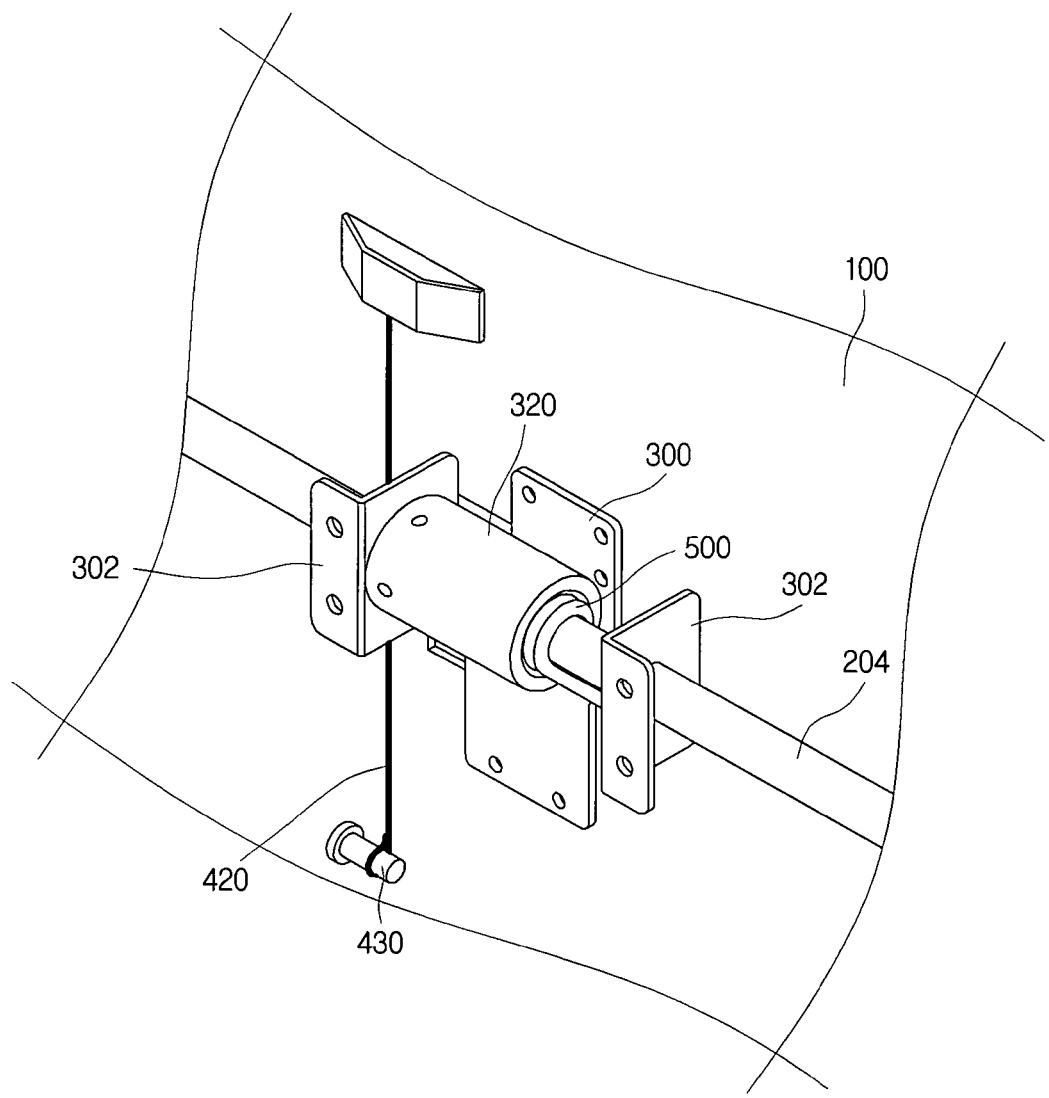
FIG. 7 is a perspective view illustrating a spring holder according to an embodiment of the invention.
Figure 8:
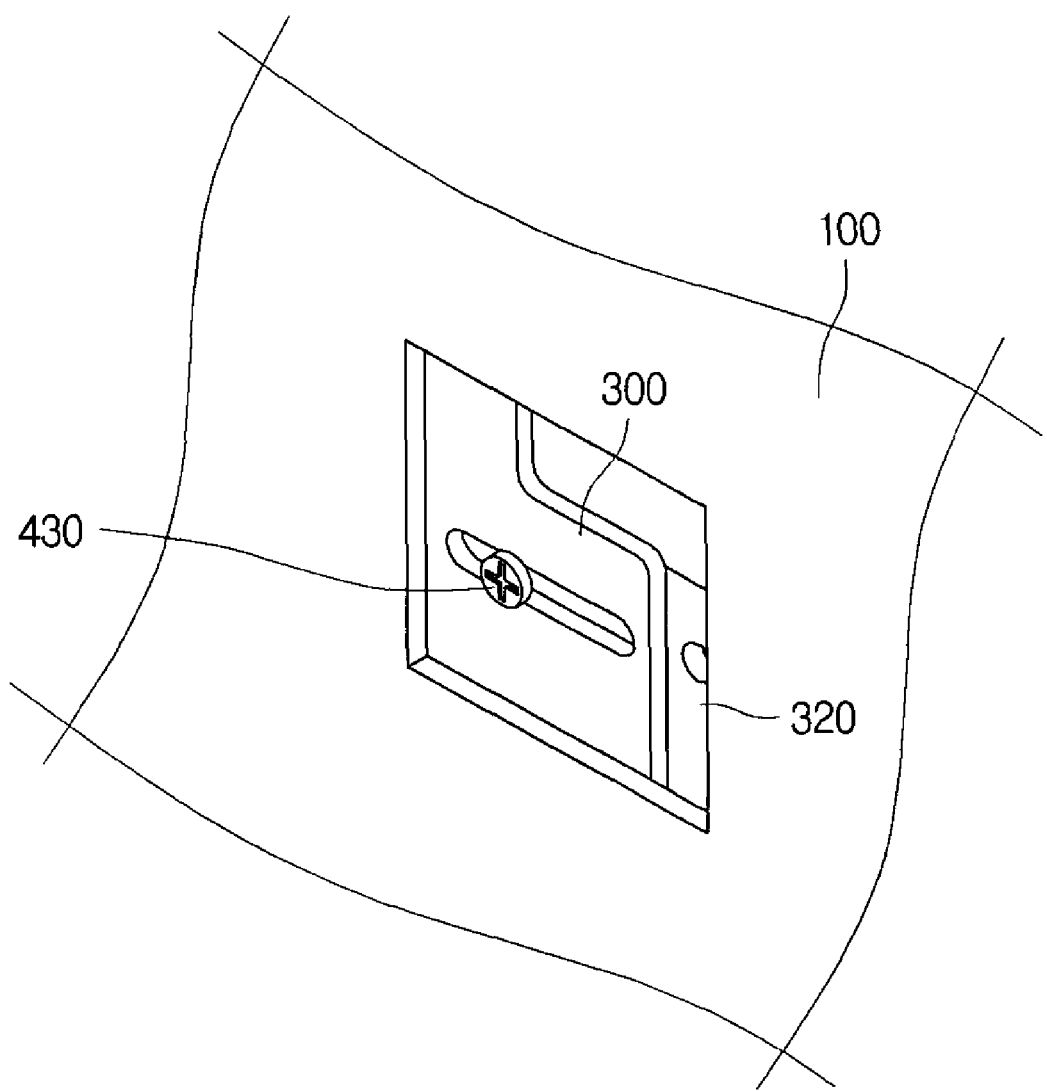
FIG. 8 is a perspective view illustrating a spring angle changer according to an embodiment of the invention.

FIG. 6 is a perspective view illustrating a prestressed spring 500 according to an embodiment of the invention, FIG. 7 is a perspective view illustrating a prestressed spring holder 320 according to an embodiment of the invention, and FIG. 8 is a perspective view illustrating a spring angle changer 300 according to an embodiment of the invention.

The tilting device 1000 may further include an elastic member, interposed between the tilt-base and the arm 200, that applies pressure on the tilt-base 100 such that the tilt-base 100 is made to tilt in a direction opposing gravity. As illustrated in FIG. 6, the elastic member can be, for example, a prestressed spring 500 wound around the tilt-shaft 204 and applying pressure on the tilt-base 100. One end of the prestressed spring 500 can be coupled to a spring holder 320, while the other end can be coupled to a spring side guide 302.

As illustrated in FIGS. 7 and 8, the spring holder 320 may be secured to a spring angle changer 300 assembled with the tilt-base 100, and may generate a torque that rotates those portions that are fixed with respect to the tilt-base 100 in regard to the tilting operation (i.e. the arm 200, center shaft 208, tilt-hanger 202, and spring side guide 302, etc.) about the tilt-shaft 204.

As a result, when the geared motor 400 winds the first wire 410 to tilt the display device, the required torque may be decreased, so that a smaller geared motor 400 can be used. This may also contribute to forming a smaller and thinner tilting device 1000.

According to certain aspects of the invention as set forth above, a tilting device can be provided, which enables tilting operations using a smaller driving device, and also allows manual operations.

While the spirit of the invention has been described in detail with reference to particular embodiments, the embodiments are for illustrative purposes only and do not limit the invention. It is to be appreciated that those skilled in the art can change or modify the embodiments without departing from the scope and spirit of the invention.

What is claimed is:

1. A tilting device for tilting a flat display panel comprising:
    an arm having a tilt-shaft formed thereon;
    a tilt-base tiltably coupled to the tilt-shaft;
    a pulley rotatably coupled to the tilt-base;
    a wire wound around the pulley, both ends of the wire being coupled to two different respective sides of the arm, the tilt-shaft being placed between the two different respective sides of the arm;
    a driving unit fixed to the tilt-base and coupled to the pulley so as to drive the pulley; and
    an elastic member interposed between the tilt-base and the arm, the elastic member applying a pressure on the tilt-base such that the tilt-base tilts in a direction opposing gravity,
    wherein the elastic member is a pre-stressed spring wound around the tilt-shaft and applying a pressure on the tilt-base.

2. The tilting device of claim 1, wherein the wire comprises:
    a first wire coupled to one of the two different respective sides of the arm; and
    a second wire coupled to the other of the two different respective sides of the arm,
    and wherein the first wire and the second wire are wound around the pulley in opposite directions.

3. The tilting device of claim 2, wherein the pulley comprises:
    a first pulley having the first wire wound therearound; and
    a second pulley secured to the first pulley and having the second wire wound therearound,
    and wherein a ratio of a diameter of the first pulley to a diameter of the second pulleys is equal to a ratio of a distance between the tilt-shaft and the one of the two different respective sides of the arm to a distance between the tilt-shaft and the other of the two different respective sides of the arm.

4. The tilting device of claim 1, further comprising:
    a friction wheel unit interposed between the pulley and the driving unit.

5. The tilting device of claim 1, further comprising:
    a sensor unit configured to identify a tilting angle of the tilt-base,
    wherein the sensor unit is coupled to the pulley and configured to measure a rotation amount of the pulley.

\* \* \* \* \*